United States Patent [19]
Lorenz et al.

[11] 3,833,274
[45] Sept. 3, 1974

[54] DAMPING BEARING

[75] Inventors: Johann Lorenz, Deutenhofen; Eberhardt Willeitner, Munich, both of Germany

[73] Assignee: Maschinenfabrik Augsburg-Nurnberg Aktiengesellschaft

[22] Filed: May 8, 1972

[21] Appl. No.: 251,268

[30] Foreign Application Priority Data
May 8, 1971  Germany............................ 2122813

[52] U.S. Cl. ............................................... 308/143
[51] Int. Cl. .......................................... F16c 27/00
[58] Field of Search..................... 308/143, 144, 145

[56] References Cited
UNITED STATES PATENTS
1,956,497  4/1934  Degerth ............................. 308/143
1,966,420  7/1934  Tholl .................................. 308/145
2,220,524  11/1940  Kapitza ............................. 308/143
3,097,167  7/1963  Beyerle ............................. 308/143

Primary Examiner—Charles J. Myhre
Assistant Examiner—Frank Susko
Attorney, Agent, or Firm—Craig & Antonelli

[57] ABSTRACT

A damping bearing for constraining a journal projecting from a rapidly spinning rotor, especially from a centrifuge barrel, in which the annular space between the damping cylinder and bearing housing is subdivided into individual, axially extending chambers.

12 Claims, 4 Drawing Figures

DAMPING BEARING

The present invention relates to a damping bearing for constraining a journal extending from a rapidly spinning rotor or barrel, especially of a centrifuge, whereby axially disposed cylindrical damping surfaces are provided in a bearing housing to achieve a radially acting hydraulic damping.

Previously disclosed solutions utilize a flexible bearing at both ends of the centrifuge rotor barrel. Use is then made in such prior art devices at the lower end of the barrel of a support bearing in conjunction with a damping cylinder, with the barrel journal (needle) supported in the cup of the bearing.

The thus-formed gyroscope carries out precession movements as well as other movements imposed by interferences. The resulting amplitudes cannot be permitted to assume any magnitude but must remain at most within a range of one-tenth or two-tenths of a millimeter. The flexible bearing therefore needs an additional damping means. This is achieved at both ends of the centrifuge barrel in that the stationary portions of the bearing are provided with cylindrical damping surfaces or damping cylinders, whereby the viscosity of the oil in an oil bath is used for the hydraulic damping.

The precession movements and superimposed interference motions are essentially circular motions which are transmitted to the damping cylinder through a pin or needle at the lower or rotor end of the centrifuge barrel. Evidence from prior tests indicates that the damping effect is not adequate especially where centrifuge barrels have great length. The circular-like motions impressed on the damping cylinder will at speeds in lower frequency ranges cause the oil to circulate.

Accordingly, the present invention is concerned with the task to provide a damping bearing in which the circulation of the oil is prevented to thereby improve the damping action of the bearing.

This is achieved according to the present invention in that the annular space between the damping cylinder and the bearing housing is partitioned or subdivided into individual axially extending chambers.

In this manner, the open annular space is thus interrupted and partitioned by individual, preferably evenly spaced dividing chambers so that the tangential circulation of the oil is prevented and axial flow is maximally benefited. The deflection of the tangentially circulating oil into an axial direction in accordance with this invention will enhance the damping action.

In one embodiment of the present invention, sheet metal fins or lamellae are arranged approximately tangentially on the damping cylinder which make contact at their ends with the bearing housing. These fins or lamellae form axial gaps in which flows the damping oil to thereby direct the flow of damping oil. An additional benefit is that an effective frictional damping takes place where the fins contact with the bearing housing.

It is additionally proposed according to the present invention that thin-walled flexible tubes are axially inserted between the damping cylinder and the bearing housing in such a manner that the tubes contact with both the cylinder and bearing housing surfaces. In this manner, a circulatory flow of the oil is again prevented and axial flow is induced for enhancing the damping effect.

According to a further feature of the present invention, use is made in the annular space of open-pore foamed material or of profile shapes whose porous volumes are distributed as evenly as possible.

These and other objects, features and advantages of the present invention will become more apparent from the following description when taken in connection with the accompanying drawing which shows, for purposes of illustration only, several embodiments in accordance with the present invention, and wherein.

Figure 1:
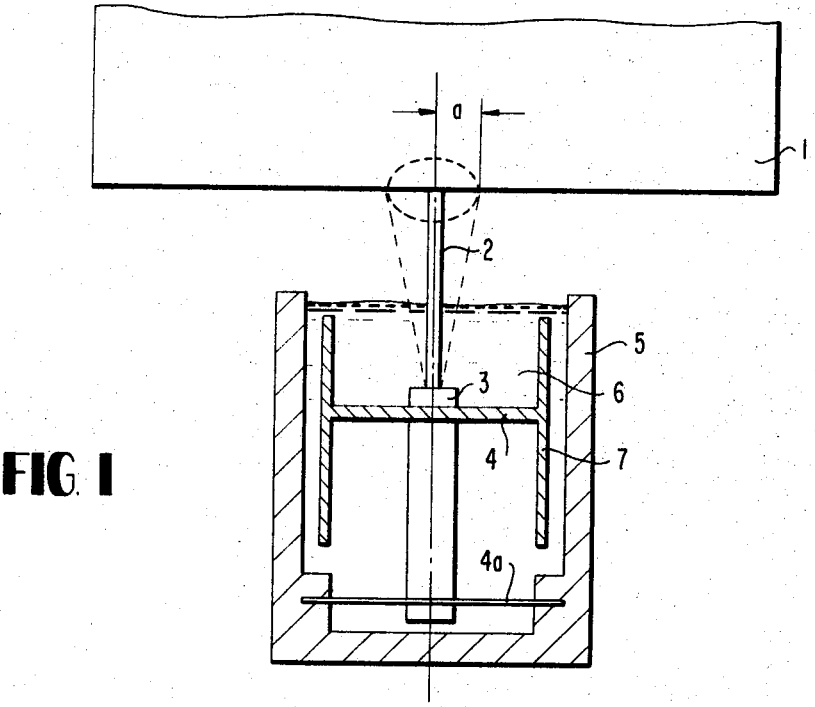
FIG. 1 is an elevational view of a damping bearing according to the present invention.

With reference to FIG. 1, a journal or needle 2 extending from a centrifugal barrel 1 is supported in a bearing 3 which is coplanar with a disc 4. The bearing 3 is axially supported against a diaphragm 4a secured to a bearing housing 5. A damping cylinder 7 is circumferentially arranged on the disc 4; the damping cylinder 7 extends parallel to and at a short distance from the inner wall of the bearing housing 5. The bearing 3 is immersed in oil 6. The circular motion resulting from the deflection "a" of the needle 2 is shown in broken line.

Figures 2, 3:
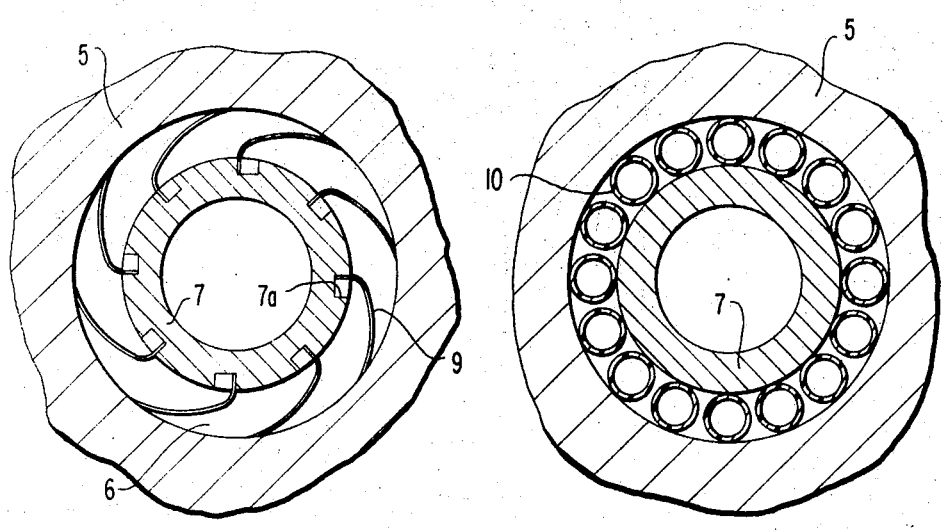
FIG. 2 is a transverse cross-sectional view through a first embodiment of a damping bearing in accordance with the present invention.
FIG. 3 is a cross-sectional view of a second embodiment of a damping bearing in accordance with this invention.

FIG. 2 is a cross-sectional view of one embodiment in accordance with the present invention. The damping cylinder 7 is provided with evenly spaced circumferentially disposed slots or grooves 7a in which sheet metal fins or lamellae 9 extending approximately tangentially to the cylinder wall are secured by means of wedges inserted into the grooves 7a. Since the fins 9 contact at their ends with the inner wall of the bearing housing 5, axially extending dividing chambers are created in which flows the oil and which serve the purpose of directing the flow of oil 6.

A further embodiment in accordance with this invention is shown in FIG. 3. A plurality of thin-walled flexible small tubes 10 are inserted equally spaced in the axial direction into the annular space which make contact with the damping cylinder 7, on the one hand, and with the bearing housing 5, on the other. These small tubes 10 consist, for example, of conventional plastic material. In this embodiment, the flow of oil is on the inside as well as on the outside of the tubes 10.

Figure 4:
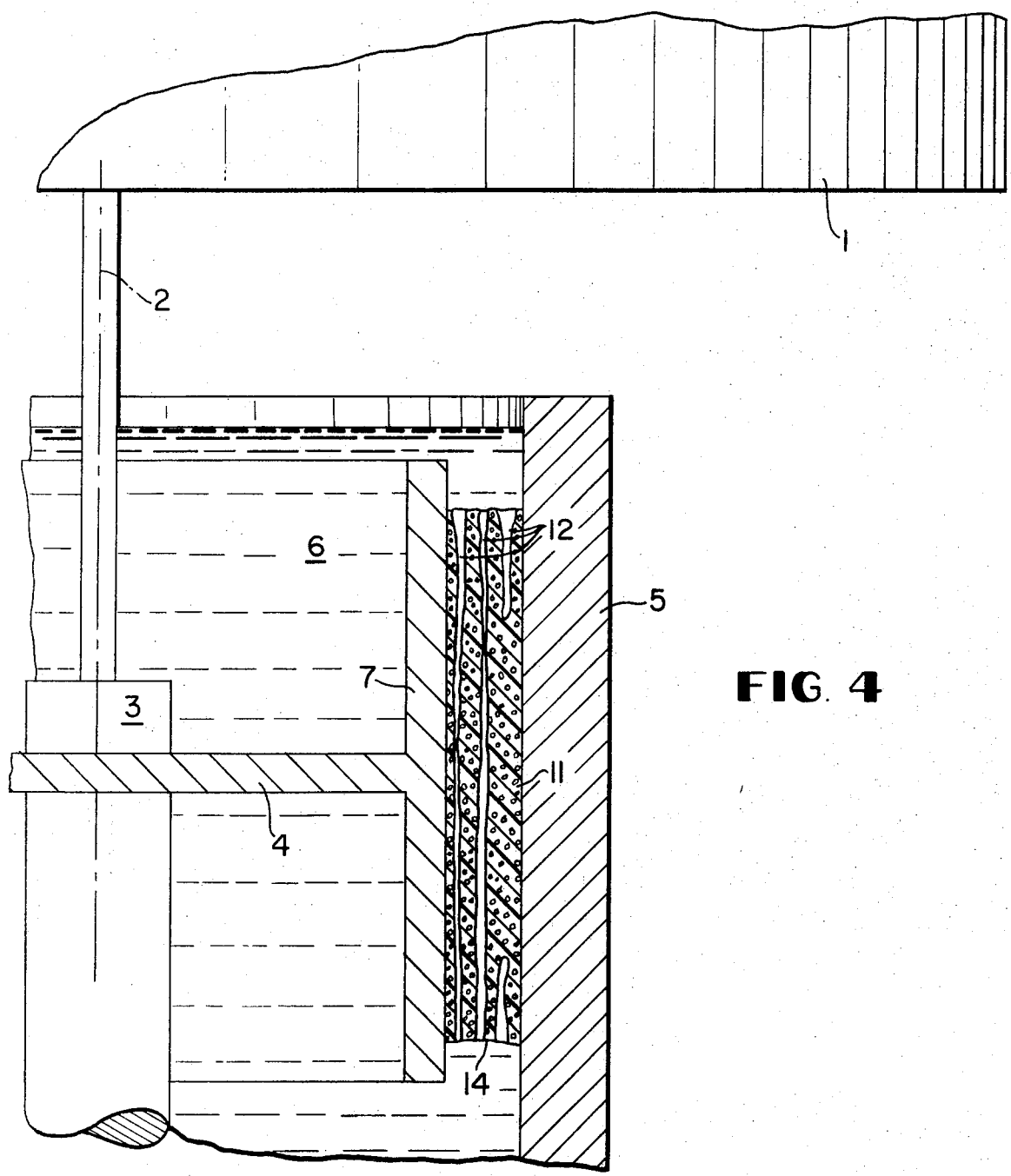
FIG. 4 is a partial elevational view of another embodiment in accordance with this invention.

FIG. 4 illustrates another embodiment of this invention in a partial elevational view similar to FIG. 1 wherein an open-pored foam material is provided in the annular space in the form of a ring 11 of foam material. The ring 11 is subdivided by open pores 12 extending from one or both surfaces 13, 14 of the ring with the pores being filled with the clamping oil 6.

The present invention is not limited to the embodiments shown and described herein, but is applicable also where, for instance, the damping oil and the lubricating oil are separated one from the other.

While we have shown and described only two embodiments in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

We claim:

1. A damping bearing for constraining a journal extending from a rapidly spinning rotor, especially from a centrifuge barrel, in which axially disposed cylindrical damping surface means are provided in a bearing housing to achieve a radially acting hydraulic damping, the damping bearing comprising a damping bearing housing means, a bearing means for receiving the hournal, a damping cylinder means secured to the bearing means, the damping cylinder means being axially disposed within the damping bearing housing means to provide an annular space between the damping cylinder means and the damping bearing housing means, chamber means provided in the annular space for subdividing the annular space into individual axially extending chambers and mounting means separate from the chamber means for nonrotatably mounting the bearing means.

2. A damping bearing according to claim 1, characterized in that the chamber means include sheet metal fins provided approximately tangentially on the damping cylinder means which contact with the ends thereof the bearing housing means.

3. A damping bearing according to claim 1, characterized in that the chamber means include relatively thin-walled flexible tubes axially disposed between the damping cylinder means and the bearing housing means in such a manner as to contact the surfaces of the cylinder and housing means.

4. A damping bearing according to claim 1, characterized in that the chamber means include open-pored foamed material inserted into the annular space whose porous volume is distributed substantially uniformly.

5. A damping bearing according to claim 1, characterized in that the chamber means include open-pored profiles are inserted into the annular space whose porous volume is distributed substantially uniformly.

6. A damping bearing according to claim 1, characterized by open-porous means serving as the chamber means in said annular space whose porous volume is distributed substantially uniformly.

7. A damping bearing according to claim 6, characterized in that the open-porous means include sheet metal fins provided approximately tangentially on the damping cylinder means which contact with the ends thereof the bearing housing means.

8. A damping bearing according to claim 6, characterized in that the open-porous means include relatively thin-walled flexible tubes axially disposed between the damping cylinder means and the bearing housing means in such a manner as to contact the surfaces of the cylinder and housing means.

9. A damping bearing according to claim 1, characterized in that the chamber means are in contact with the bearing housing means without being secured thereto.

10. A damping bearing according to claim 1, characterized in that the damping cylinder means is arranged in a fluid medium contained within the damping bearing housing means, and the chamber means prevent the circulation of the fluid medium about the damping cylinder means.

11. A damping bearing according to claim 1, characterized in that the damping cylinder means is rigidly secured to the bearing means by a plate member extending radially outwardly from the bearing means, the damping cylinder means extending axially from at least one side of the plate member.

12. A damping bearing according to claim 11, characterized in that the damping cylinder means extends in the axial direction from both sides of the plate member.

* * * * *